Dec. 4, 1934.                F. J. KURTH                1,982,747
                           VENTILATING DEVICE
                  Filed April 20, 1933        2 Sheets-Sheet 1

INVENTOR.
FRANZ J. KURTH.
BY
        ATTORNEY.

Dec. 4, 1934.  F. J. KURTH  1,982,747
VENTILATING DEVICE
Filed April 20, 1933   2 Sheets-Sheet 2

INVENTOR.
FRANZ J. KURTH.
BY
ATTORNEY.

Patented Dec. 4, 1934

1,982,747

UNITED STATES PATENT OFFICE 1,982,747

VENTILATING DEVICE

Franz Josef Kurth, Cologne-Dellbruck, Germany

Application April 26, 1933, Serial No. 667,017
In Germany October 29, 1932

9 Claims. (Cl. 98—8)

My invention relates to ventilating devices and more especially ventilating devices adapted for use on moving vehicles, such as automobiles, railway cars, street cars, and the like, including ships.

The ventilating device according to the present invention is so designed, that atmospheric outside air is constantly supplied to the interior of the vehicle, while the same is in motion, and, at the same time, the used air in the vehicle is drawn off, and this exchange of air is effected without any sensation of draft being experienced by the occupants of the vehicle.

The device according to this invention is preferably attached to the roof of the vehicle, one part projecting from the top of the roof and having an opening facing in the direction in which the vehicle moves, and another opening facing in the opposite direction, while a third opening leads to the interior of the vehicle.

Figure 1:
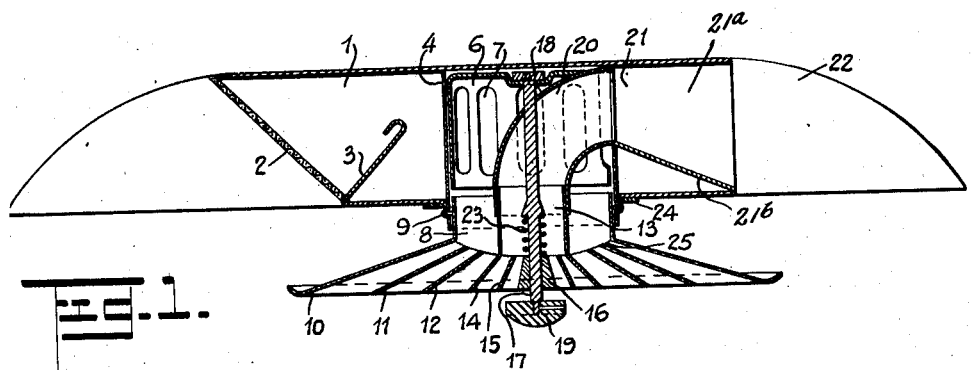

For a more complete understanding of this invention, I refer to the annexed drawings, on which I have shown, by way of illustration, a preferable embodiment thereof, and on which Fig. 1 is a vertical sectional side elevation of the ventilating device in its entirety.

Figure 2:
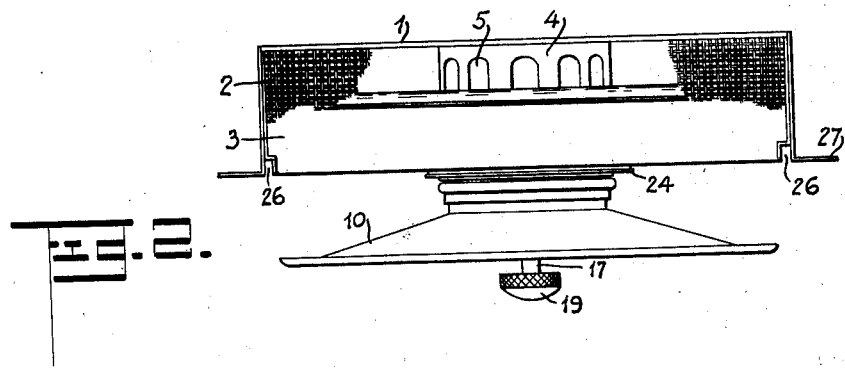
Figure 3:
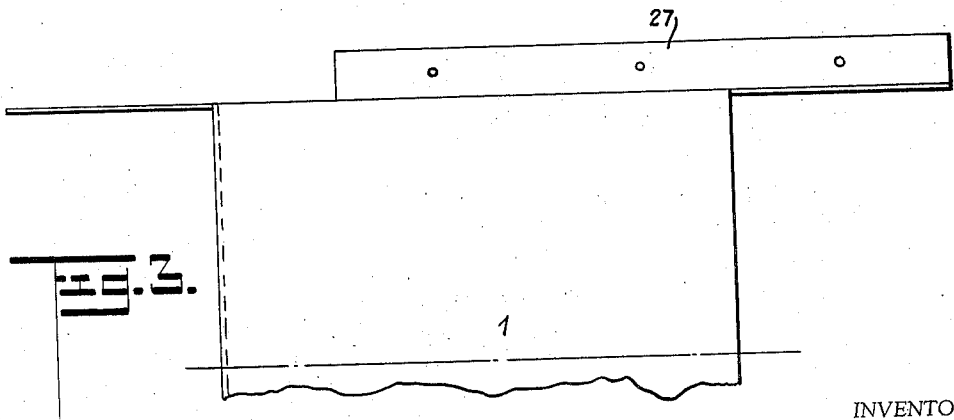
Figure 4:
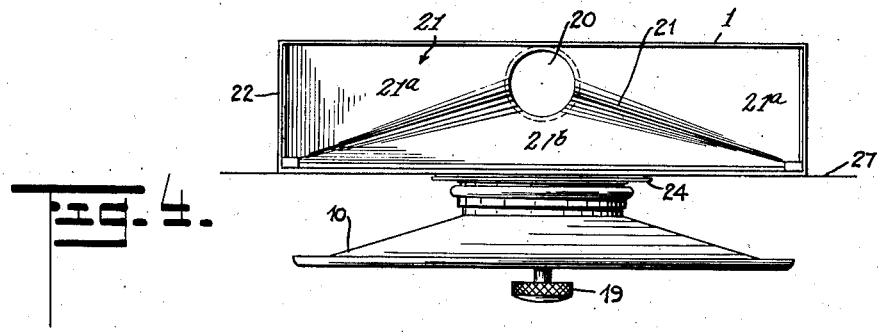
Figure 5:
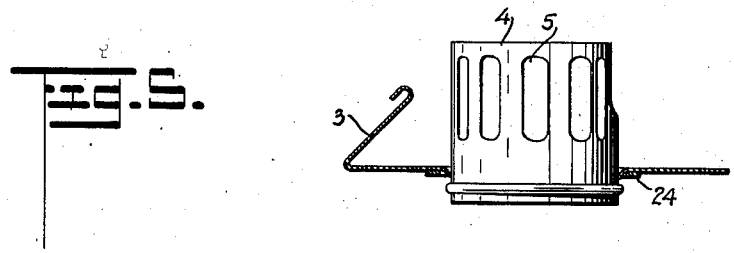
Figure 6:
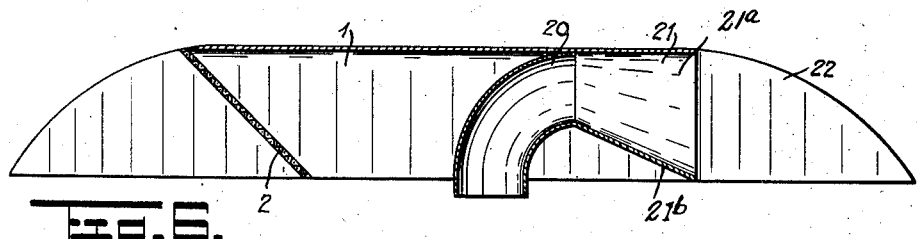
Figures 7, 8:
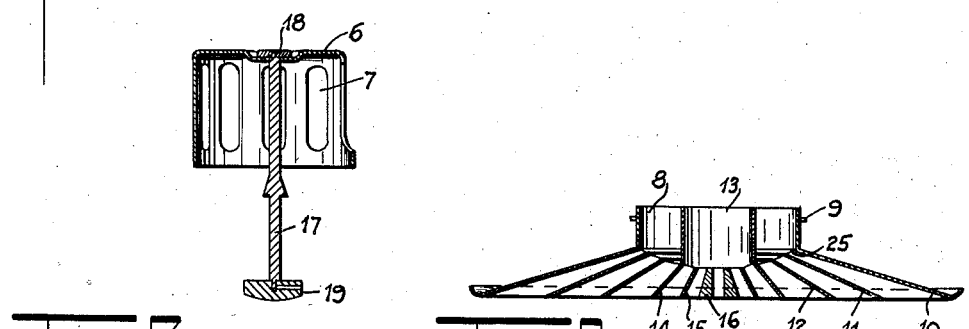

Fig. 2 a front elevation with a portion of the screen at the front of the receiving chamber broken away, Fig. 3 a fragmentary top plan view, and Fig. 4 a rear end elevation, while Figs. 5, 6, 7 and 8 show details.

As shown on the drawings, and more particularly in Fig. 1, the air receiving chamber for the outside atmospheric air is shown at 1. This chamber is an elongated shallow structure of substantial width as more clearly shown in Figure 2, and it is closed at its top, sides, bottom and rear and open at its front for the admission of air thereto. At the open front end of said receiving chamber, that is on the left hand side of Fig. 1, is provided a downwardly and rearwardly inclined screen shown at 2. Behind said screen, mounted at an upward and rearward inclination, is disposed a deflector plate shown at 3. This deflector plate extends from the bottom of the chamber 1 to a point spaced from the top of said chamber and is provided to intercept rain, snow and the like. As shown, the upper edge portion of said plate is directed forwardly so as to act as a stop to prevent rain, snow or the like from passing upwardly along the plate and over the upper edge thereof into the chamber space to the rear of the plate. Also, as shown, the side walls of the chamber extend forwardly beyond the screen 2 to assist in directing air through the open front of the chamber into the chamber. In or near the center of the air receiving chamber is provided a cylindrical stationary drum 4 having in its circumference vertically extending slots 5. Inside this stationary drum 4 is rotatably mounted a smaller cylindrical drum 6 provided in its circumference with similar slots, 7. The stationary drum 4 extends somewhat below the bottom of the air receiving chamber 1 and carries an air-inlet pipe shown at 8 which may be attached to the projecting lower end of the drum by means of a bayonet joint shown at 9. The discharge end of the air-inlet pipe 8 is enlarged by means of coaxially disposed mutually spaced inverted hollow cones shown at 10, 11 and 12. The number of these cones may vary, and instead of a plurality of cones, a single cone may be provided.

Within said air-inlet pipe, suitably spaced therefrom, is mounted an air-outlet pipe 13, the mouth of which as shown on Fig. 1 is also enlarged by coaxially disposed mutually spaced hollow cones 14 and 15. Also the number of these cones may vary. In the center of the hollow cones 14 and 15 is a small solid cone 16 which is provided with a bore. At 17 is shown a spindle, passing through this bore. At 18 in Fig. 1 is shown a small plate attached to the outside of the rotatable drum 6 in the center thereof and provided with a non-circular hole to receive the non-circular end of spindle 17, which is provided with a knurled knob 19, by means of which the spindle and thereby the rotatable drum 6 may be turned within the stationary drum 4 in either direction to thus regulate the amount of air entering the inlet pipe 8 from the receiving chamber 1.

As shown in Fig. 1, there is attached to the discharge end of the air-outlet-pipe 13 a curved hollow member 20 which extends through recesses in the two drums and has attached to it the forward end of an open-top funnel-shaped extension 21. The forward end of said extension 21 is of circular shape and of the same diameter as the member 20, thereby forming a rearward continuation of said member 20. Moreover, said extension 21 comprises side walls 21ª which flare rearwardly and outwardly relative to each other and extend to the side walls of the chamber 1, and a bottom wall 21ᵇ which slopes rearwardly and downwardly and extends to the bottom wall of the chamber 1, the open top of said extension being closed by the top wall of the chamber 1. Thus, said extension 21 serves to close the rear end of the chamber 1 and at the same time constitutes a rearwardly opening and flaring discharge conduit as a rearward extension of the hollow member 20. As shown at 22, the side walls of the chamber 1 preferably are extended rearwardly beyond the rear, open end of the extension 21.

At 23 in Fig. 1 is shown a spring encircling the spindle 17 between the cone 16 and a shoulder on said spindle for holding the spindle with its non-circular end engaged in the hole in the plate 18.

At 24 in Fig. 1 is shown a gasket for preventing moisture from penetrating into the vehicle.

At 25 are shown supporting rods for holding in place the cones 10, 11 and 12 and the smaller cones 14 and 15.

At 26 in Fig. 2 are shown drain openings at the lower corners of the screen 2. The deflector plate 3 is provided with similar openings (not shown).

The details of construction are clearly shown in Figs. 4–8 of the drawings and need no further description.

Fig. 3 shows at 27 flanges, whereby the ventilating device is attached to the top of the vehicle.

The device operates as follows:

When the vehicle is in motion, outside atmospheric air flows through the screen 2 at the forward end of the air-receiving chamber 1 and through the air regulating device formed by the two concentric drums 4 and 6 into the air-inlet pipe 8, from the discharge end of which, enlarged by the spaced cones 10, 11 and 12, it spreads out in all directions inside the vehicle with an accompanying loss of its kinetic energy, flowing mostly along the ceiling and down the sidewalls of the vehicle toward the floor thereof. Because of the constant inflow of fresh air, a slight pressure is produced in the interior of the vehicle. The air inside the vehicle tends to equalize said pressure along the path of least resistance, which path leads to the air outlet pipe 13, the mouth of which is enlarged, as has above been described, by the spaced cones 14 and 15. The air-outlet pipe 13 and the curved hollow member 20 attached thereto contain rarified air, which rarification is caused by the injector action of the atmospheric air streaming past the rearward extension of the air receiving chamber.

In this way, a constant circulation of fresh air is produced, the air moving from the air-inlet pipe 8 along the ceiling inside the vehicle and down the sides thereof toward the floor and thence upward through the center of the vehicle back toward the ceiling into the air outlet pipe 13. Because of the enlarged discharge end of the air-inlet pipe 8 and the likewise enlarged mouth of the air-outlet pipe 13, a short circuit of the air is avoided, that is to say, the incoming outside air does not flow from the air-inlet pipe directly back into the air outlet pipe, but is compelled to flow through the entire interior of the vehicle. Because the inflowing outside air loses the effective part of its kinetic energy through its being divided into separate streams which occurs immediately prior to its entrance into the vehicle and the outflowing air is accelerated only inside the cone or cones provided at the mouth of the air-outlet pipe, the occupants of the vehicle are in no way inconvenienced or made uncomfortable by any sensation of draft.

It is obvious that the ventilating device is susceptible of various modifications without a departure from the essence of the invention.

I claim:

1. A ventilating device comprising a chamber closed at its top, sides, bottom and rear and open at its front, a downwardly and rearwardly inclined screen at the front of said chamber, and a conduit for flow of air from said chamber, the side walls of the chamber extending forwardly beyond said screen and the space between said side walls in front of said screen being unobstructed.

2. A ventilating device comprising a chamber closed at its top, sides, bottom and rear and open at its front, a downwardly and rearwardly directed screen at the front of said chamber, an upwardly and rearwardly inclined deflector plate disposed rearwardly of said screen, and a conduit for flow of air from said chamber, the side walls of the chamber extending forwardly beyond said screen, the space between said side walls in front of said screen being unobstructed, and said deflector plate extending from the bottom wall of the chamber upwardly to a point spaced from the top wall of the chamber.

3. A ventilating device comprising a chamber closed at its top, sides, bottom and rear and open at its front for the admission of air thereto, a conduit for flow of air from said chamber to an enclosure to be supplied with air, and a second conduit for flow of air from the inclosure to the atmosphere, said second conduit extending through the chamber and serving as a closure for the rear end thereof and having a flared discharge end portion, the bottom wall of the second mentioned conduit sloping inwardly and upwardly from the rear end of the chamber, and the top wall of the chamber overlying the sloping bottom wall of said second mentioned conduit to prevent rain, snow and the like from entering the latter conduit.

4. A ventilating device comprising a chamber closed at its top, sides, bottom and rear and open at its front for the admission of air thereto, a conduit for flow of air from said chamber to an enclosure to be supplied with air, and a second conduit for flow of air from the enclosure to the atmosphere, said second conduit extending through the chamber and serving as a closure for the rear end thereof and having a flared discharge end portion the bottom wall of which slopes inwardly and upwardly from the rear end of the chamber, the top wall of the chamber overlying the sloping bottom wall of said second mentioned conduit to prevent rain, snow and the like from entering the latter conduit.

5. A ventilating device comprising a chamber closed at its top, sides, bottom and rear and open at its front for the admission of air thereto, a vertically disposed hollow cylindrical member within said chamber extending from top to bottom thereof and provided with a side opening, a second hollow cylindrical member closely fitting said first mentioned member and provided with a side opening, said second mentioned member being rotatable relative to said first mentioned member to aline and disaline said openings, said first mentioned member leading from said chamber through the bottom wall thereof for flow of air from the chamber to an enclosure to be supplied with air, and an air outlet conduit disposed within the innermost of said hollow members and having an outlet end extending through other alined openings in said hollow members.

6. A ventilating device comprising a casing having a chamber closed at its top, sides, bottom and rear and open at its front for the admission of air thereto, a hollow cylindrical member within said chamber leading therefrom through one of the walls thereof, said member having an opening in a wall thereof within the chamber and, within said chamber, being otherwise closed, a second hollow cylindrical member closely fitting said first mentioned member and rotatable relative thereto, said second mentioned member having an opening for alinement with and disalinement from the opening in the first mentioned member by rotation of the second mentioned member, air distributing means exteriorly of the casing connected with said first mentioned cylindrical member, and an air outlet conduit disposed within the innermost of said hollow members and having an outlet end extending through other alined openings in said hollow members.

7. A ventilating device comprising a chamber closed at its top, sides, bottom and rear and open at its front for admission of air thereto, a pair of interfitting hollow cylindrical members within said chamber leading therefrom for flow of air from the chamber to an enclosure to be supplied with air, one of said members being rotatable relative to the other, and said members having openings within the chamber to be alined and disalined by rotation of the rotatable member to regulate flow of air from the chamber through the members, and a conduit for flow of air from the enclosure, said conduit extending through said members and serving as a closure for the rear end of said chamber and itself opening at its rear end to the atmosphere.

8. In a ventilating device, a pair of conduits for the supply and exhaust, respectively, of air to and from an enclosure, said conduits being disposed one within the other, a plurality of spaced apart nested truncated hollow flaring air distributing members at the outlet end of the air inlet conduit, and a plurality of spaced apart nested truncated hollow flaring air collection members at the inlet end of the air exhaust conduit, the members at the inlet end of the exhaust conduit being disposed within the innermost of the members at the outlet end of the air supply conduit.

9. A ventilating device comprising a chamber closed at its top, sides, bottom and rear and open at its front for the admission of air thereto, a vertically disposed hollow cylindrical member within said chamber extending from top to bottom thereof and provided within said chamber with a side opening, a second hollow cylindrical member within and closely fitting said first cylindrical member, said second mentioned cylindrical member having a side opening and being rotatable to aline and disaline its opening with and from the opening in said first mentioned cylindrical member, both cylindrical members being open at their lower ends, said first mentioned cylindrical member leading from said chamber through the bottom wall thereof, air distributing means outside of said chamber connected to the lower open end of said first mentioned cylindrical member, a conduit within and of lesser diameter than said cylindrical members having an open lower end, air distributing means connected with the lower open end of said conduit and nested within the air distributing means connected with the first mentioned cylindrical member, said conduit extending laterally and rearwardly at its upper end through the cylindrical members, and a funnel-shaped element connected with the upper end of said conduit within the chamber and constituting a closure for the rear end of the latter.

FRANZ JOSEF KURTH.